(12) United States Patent
Zambetti et al.

(10) Patent No.: US 8,044,645 B2
(45) Date of Patent: Oct. 25, 2011

(54) MULTI-PHASE VOLTAGE REGULATOR

(75) Inventors: Osvaldo Enrico Zambetti, Milan (IT); Alessandro Zafarana, Milan (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 609 days.

(21) Appl. No.: 11/911,486

(22) PCT Filed: Apr. 12, 2005

(86) PCT No.: PCT/IT2005/000205
§ 371 (c)(1),
(2), (4) Date: Oct. 12, 2007

(87) PCT Pub. No.: WO2006/109329
PCT Pub. Date: Oct. 19, 2006

(65) Prior Publication Data
US 2008/0169797 A1 Jul. 17, 2008

(51) Int. Cl.
*G05F 1/59* (2006.01)
(52) U.S. Cl. ........................... 323/272; 323/285
(58) Field of Classification Search ................ 323/272, 323/286, 282–285
See application file for complete search history.

(56) References Cited

U.S. PATENT DOCUMENTS

| 6,278,263 | B1* | 8/2001 | Walters et al. | 323/272 |
|---|---|---|---|---|
| 6,424,129 | B1* | 7/2002 | Lethellier | 323/272 |
| 6,683,441 | B2* | 1/2004 | Schiff et al. | 323/222 |
| 6,912,144 | B1* | 6/2005 | Clavette | 363/98 |
| 7,027,944 | B2* | 4/2006 | Tabaian et al. | 702/106 |
| 7,064,528 | B2* | 6/2006 | Jochum et al. | 323/266 |
| 2003/0038614 | A1* | 2/2003 | Walters et al. | 323/282 |
| 2003/0102849 | A1 | 6/2003 | Schiff et al. | 323/222 |
| 2003/0107358 | A1 | 6/2003 | Isham et al. | 323/283 |
| 2004/0178779 | A1 | 9/2004 | Walters et al. | 323/277 |
| 2005/0017703 | A1 | 1/2005 | Walters et al. | 323/288 |
| 2009/0051334 | A1* | 2/2009 | Huang | 323/247 |

* cited by examiner

*Primary Examiner* — Harry Behm
(74) *Attorney, Agent, or Firm* — Lisa K. Jorgenson; Allen, Dyer, Doppelt, Milbrath & Gilchrist, P.A.

(57) ABSTRACT

A multiphase voltage regulator provides a voltage to an output terminal. The voltage regulator includes N parallel switches providing respective current phases that are added together to generate a total current for a general load coupled to the output terminal. The voltage regulator also includes N inductive circuits. Each inductive circuit is between an output node of a respective switch and the output terminal. A sense circuit adds the voltages in each of the output nodes of the N switches. An amplifier circuit has an input receiving the added voltage, and outputs a current proportional to the total current. A controller with two pins reads the total current. The two pins are connected to the inputs of the amplifier.

16 Claims, 11 Drawing Sheets

Interleaving = phase shift = T/N

MULTI-PHASE VOLTAGE REGULATOR

RELATED APPLICATION

This application claims the benefit of International Application No. PCT/IT2005/000205 filed Apr. 12, 2005, the entire contents of which are incorporated herein by reference.

FIELD OF THE INVENTION

Moreover, the first input 11 and the second input 12 of the operational amplifier 10 are the only two pins CS+ and CS− used by a controller 15 to read the current $I_{OUT}$. The controller 15 is schematically represented in the figure and operates on the input voltage $V_{IN}$ of the first and second switch 3a and 3b to keep the sum of the current phases $I_{PHASE1}$, $I_{PHASE2}$ and thus the total current $I_{OUT}$ constant.

BACKGROUND OF THE INVENTION

The multiphase voltage regulator is an electronic device used in several applications. For example, the multiphase voltage regulator may be used as a power supply in microprocessors for personal computers, workstations, servers, printers and other similar electronic equipment.

Electronic device microprocessors are at present being developed to meet the requirements sought by CPUs. Current CPUs require a high supply voltage precision, which can be approximately estimated in a voltage variation request of $\Delta V=(+/-0.8\%)$ in steady state conditions, and of $\Delta V=(+/-3\%)$ in transient conditions. Unfortunately, supply voltages can usually decrease to values of 1.1V while load currents can rise up to 100 A with possible slopes of 100 A/μs. However, an efficiency higher than 80% may be desired.

Research has identified the voltage regulator topology as a cheaper and more effective approach to meet the present requirements. The voltage regulator is realized in several configurations, and it allows a desired output voltage to be provided proportionally to the current required by the microprocessor. This feature is called a droop function or voltage positioning.

The droop function feature causes a device comprising a Current Sense circuit to be provided. This allows the current to be output by the device to be read or estimated. In general, the Current Sense circuit reads the current as a voltage drop across a resistance. This resistance can be a voltage regulator parasitic element. For example, in power switches the resistance may be the resistance Rds, on or the parasitic resistance of the inductance DCR. Alternatively, the resistance may be an element inserted in the circuit, such as a resistance Rsense, for example.

If a resistance Rsense is used, a very precise current reading is advantageously provided. Moreover, since constantan-made resistances are generally used, the reading is almost independent from temperature variations.

Nevertheless, this approach has for its known advantages the drawback of being a higher cost and for providing a reduced current conversion efficiency. If a regulator parasitic element is instead used, the approach is more economical since it exploits elements already in the regulator. But it also provides a less precise reading that is sensitive to single element errors, and to the variations produced therefrom according to the temperature of the regulator.

In particular, a current reading on the inductance parasitic resistance (DCR) has some advantages in terms of precision. The tolerance in this case is 5%. This is with respect to the reading on the resistance Rds,on of the low-side switch having a tolerance of about 30%.

Several voltage regulators with reading systems comprising the droop function implemented to obtain the current measure of the voltage regulator module (VRM) inductors are available. An example of a voltage regulator in a standard dual-phase configuration, also called a multiphase DC-DC converter, is represented in FIG. 1. The voltage regulator has for each module or phase a dc-dc switch comprising a pair of field-effect transistors, HS and LS, interposed in series between an input voltage Vin and a ground voltage. An inductance L is interposed between an intermediate node of the two transistors HS and LS and the output.

The output current of each module is added to the current coming from the other modules. This defines the output current of the voltage regulator $I_{OUT}$. The voltage regulator has, for each module, a Current Sense circuit comprising a parasitic resistance $R_L$ of the inductance L, and a filtering network comprising a capacitor C and a resistance R providing the output signal at the input of the inductance L. In particular, the value of the resistance R is defined so that for each circuit the relation $R*C=L/R_L$ applies.

Therefore, the output current of the first switching element has a sawtoothed configuration as indicated by Phase 1 current in the graph of FIG. 2. Also, the output current $I_{OUT}$ of the voltage regulator, which is the sum of the two current signals, has a sawtoothed configuration and a period corresponding to T/2.

In general, a multiphase voltage regulator with N switches has an output current with a sawtoothed configuration with a period corresponding to T/N. Nevertheless, the voltage regulators require a control circuit of the phase displacements between the input currents of the N switches. This allows a feedback operation on the switches.

A known device is described in U.S. Pat. No. 5,982,160 to Walters et al., where an R-C current sense network is connected in parallel to each output inductor of the voltage regulator, as emphasized in FIG. 3. Values of the current sense circuit, i.e., R and C, are determined by the time constant matching. That is, by the equality between the time constant of the circuit $R_L$-L or coil network and of the current sense R-C circuit.

Moreover, the current sense circuit current signal of each R-C network is analyzed together with the output signal through a resistance Rg by a controller. In the case represented in FIG. 3, a circuit is shown for estimating the output current of the dual-phase voltage regulator emphasizing that the controller for each R-C network analyses two pins. Therefore, by generalizing, for N phases or modules the controller analyzes 2N pins.

However, the voltage regulator according to the provided approach, although advantageous under several aspects, has some drawbacks. The controller produces a current or voltage signal which will be proportional to the resistance $R_L$, $R_G$, and to the output current $I_{OUT}$. Therefore, the good quality of the produced signal will depend on the good quality of the inserted components, and on the variations thereof according to the temperature. This regulator requires N R-C networks, one for each phase. The capacitor $C_{CS}$ is generally of the COG type, and is particularly expensive. The controller requires 2*N pins to read the total current.

This involves a regulator circuit complexity and the need for a considerable surface for the in-silicon-chip integration. Moreover, the N R-C networks can insert some delays in output signals that could invalidate the voltage regulator reliability.

A further known multiphase voltage regulator is described in U.S. Pat. No. 6,683,441 B2 to Schiff et al. and is shown in FIG. 4 in a dual-phase example. In this approach, the voltages of the two nodes, PHASE1 and PHASE2, are added, preferably by a resistance Rp, and sent to an operational amplifier which further receives the regulator output voltage.

The operational amplifier has feedback, an R-C network, or a circuit sense, comprising a resistance $R_{CS}$ and a capacitor $C_{CS}$ located in parallel and defined so that $R_{CS}$ is determined by the time constant matching between the time constant $R_L$-L e $R_{CS}$-$C_{CS}$. This is done to output a voltage VCS proportional to the regulator output current $I_{OUT}$, according to the relation:

$$V_{CS} = V_{OUT} - \frac{R_L \cdot R_{CS}}{R_P} \cdot I_{OUT}$$

A controller then analyses the two input signals and the output signal of the operational amplifier, thus requiring three pins. To obtain a signal being directly proportional to the regulator output voltage Vout, it is necessary to use, after the operational amplifier, a further amplifier for removing the constant term Vout, according to the relation:

$$V_{DROOP} = V_{OUT} - V_{CS} = \frac{R_L \cdot R_{CS}}{R_P} \cdot I_{OUT}$$

Therefore, the present approach, though responding to the problem and being advantageous under several aspects, has some drawbacks. This includes requiring the use of N external resistances $R_P$ for the adder node, a sense circuit comprising the R-C network for the time constant matching and an amplifier, while the controller requires three pins for the reading. Moreover, to proportionally determine the regulator output voltage, a second amplifier needs to be available.

In voltage regulators that are currently available, the presence of more precise components to meet the need for more stringent specifications, poses further problems. In particular, the use of smaller and smaller inductors with lower and lower parasitic resistances $R_L$ clashes with the presence of the parasitic resistances on the application boards because of the unavoidable resistances due to the copper tracks.

As emphasized in FIG. 5, for a dual-phase regulator, the presence of the parasitic resistances $R_{p1}$ in series with the resistances $R_L$ requires a reading circuit that can read the information directly across the coil network. That is, the inductance L in series with the resistance $R_L$ avoids the parasitic resistances $R_{Pi}$ of the board tracks. This reading typology is called fully differential.

The current reading described in U.S. Pat. No. 5,982,160 to Walter et al., shown in FIG. 3, is a fully differential reading. Nevertheless, this approach requires, as already emphasized, N R-C networks where N is the number of phases and 2*N is the number of pins for the total current reading.

With the case indicated in U.S. Pat. No. 6,683,441 and as shown in FIG. 4, a fully differential current reading can not be provided since this approach takes as a reference the output voltage $V_{OUT}$, summing both phases. Therefore, if there were different parasitic resistances for the two phases, an error would be committed in the current measure.

SUMMARY OF THE INVENTION

In view of the foregoing background, an object of the present invention is to provide a voltage regulator comprising a straightforward and reliable Current Sense circuit having structural and functional features so as to make the regulator particularly compact. This allows the use of external components to be minimized or reduced. This in turn also reduces the area occupied on the silicon chip where the voltage regulator is integrated, and the area occupied on the board. The number of pins required by the controller to read the output signal is also reduced.

Another object of the present invention is to form a current sense circuit for a fully differential voltage regulator on the coil circuit to obtain a reading that is independent from the resistances due to the copper tracks on the application board.

These and other objects, advantages and features in accordance with the present invention are provided by generation of a current signal being directly proportional to the total current provided by the voltage regulator independently from the number of phases and from the value of the parasitic resistances created by the tracks on the board. This may be accomplished by using two PINs for the reading thereof.

One aspect is directed to a multiphase voltage regulator comprising an output terminal for providing a regulated output voltage to a load. A plurality of switches may be in parallel to each other for providing a plurality of current phases, with the plurality of current phases being added together to generate a total current for the output terminal. A plurality of inductive circuits may be coupled between outputs of the plurality of switches and the output terminal. A sense circuit may add voltages on the outputs of the plurality of switches. An amplifier circuit may have a first input for receiving the added voltage from the sense circuit, and may generate a current proportional to the total current.

BRIEF DESCRIPTION OF THE DRAWINGS

The features and advantages of the multiphase voltage regulator according to the invention will be apparent from the following description of embodiments thereof given by way of non-limiting examples with reference to the attached drawings.

DETAILED DESCRIPTION OF THE PREFERRED EMBODIMENTS

Figure 6:
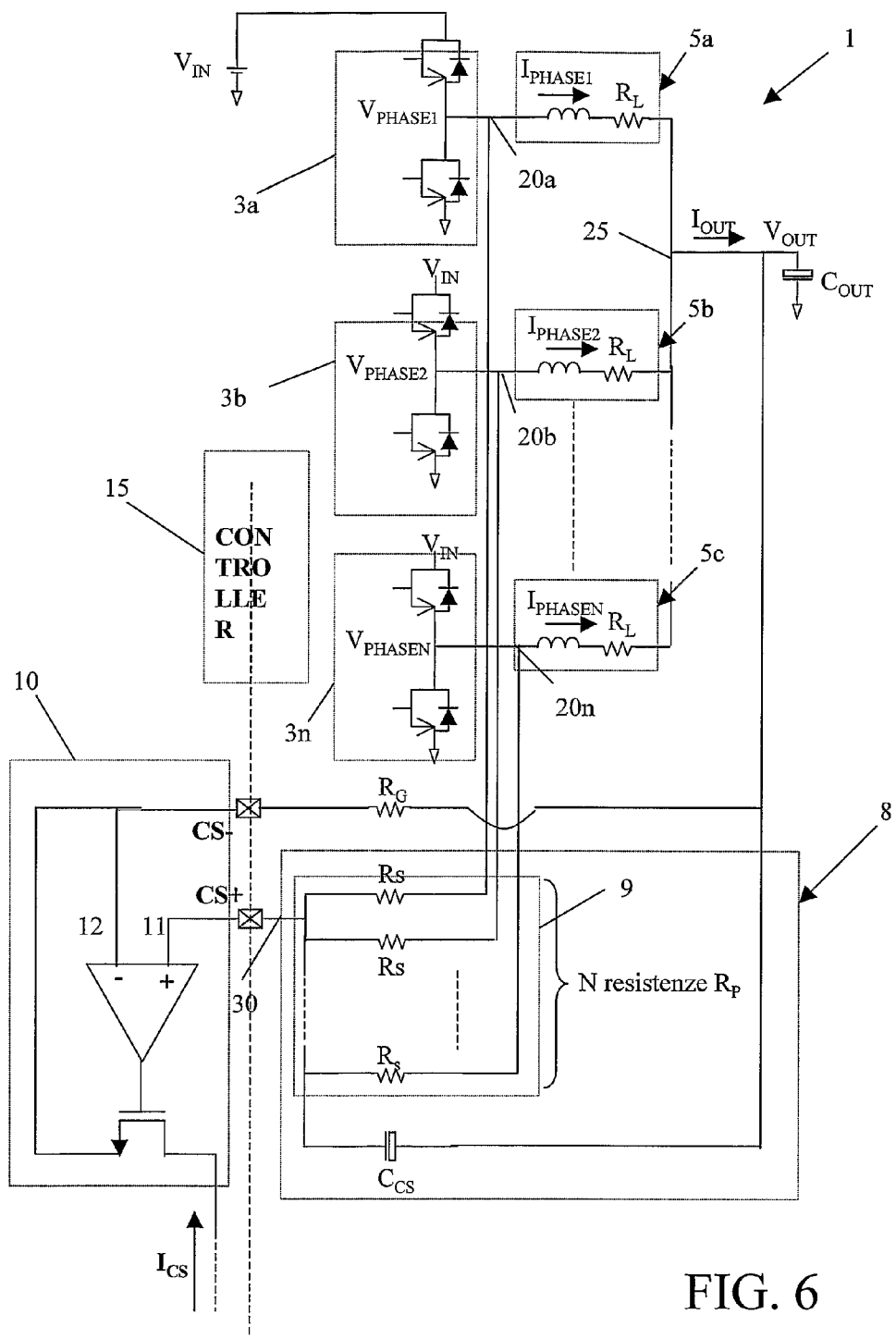
FIG. 6 shows an N-phase voltage regulator according to the present invention.

With reference to the figures, and particularly to FIG. 6, a voltage regulator 1 according the present invention is shown.

The voltage regulator 1 generates an output voltage $V_{OUT}$ for a general load, indicated with $C_{OUT}$.

Figure 7:
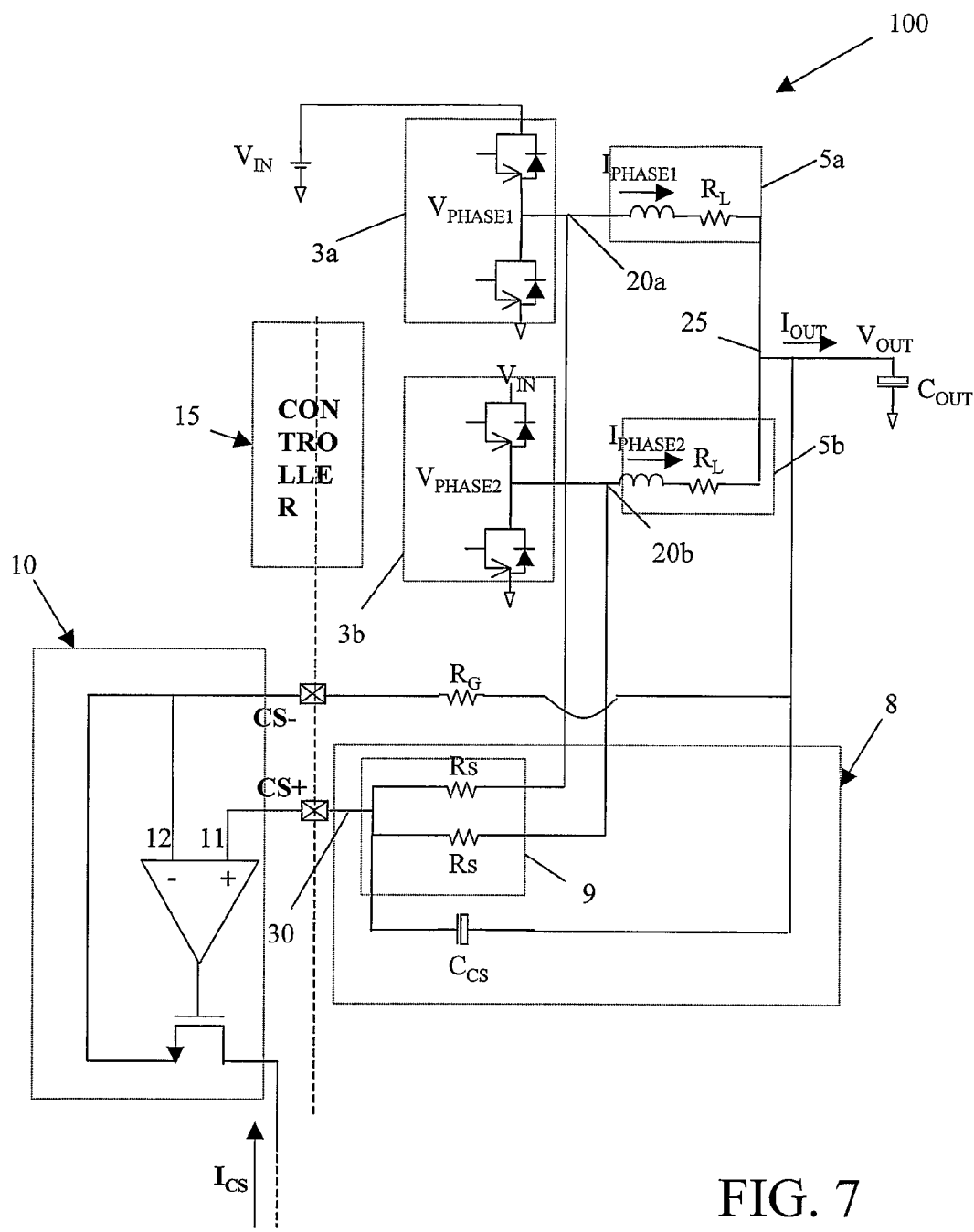
FIG. 7 shows a dual-phase voltage regulator according to the present invention.

For convenience of illustration, a dual-phase voltage regulator 100 is shown in FIG. 7. The dual-phase voltage regulator 100 comprises a first switch 3a and a second switch 3b located in parallel to each other. Each switch is interposed between an input current $V_{IN}$ and a ground current.

For greater clarity, it is first considered that the parasitic resistances due to the board copper tracks are negligible. A more detailed description will be provided below.

The first and second switches 3a, 3b have a voltage $V_{PHASE1}$, $V_{PHASE2}$ at the respective output nodes 20a, 20b and respective current phases $I_{PHASE1}$, $I_{PHASE2}$ which, through respective inductive circuits 5a, 5b added in correspondence with an output terminal 25 generate the total current $I_{OUT}$ to be provided to a general load $C_{OUT}$.

Each inductive circuit 5a, 5b comprises an inductance L and a resistance $R_L$. This inductive circuit could obviously have a different configuration. Advantageously, the voltage regulator 100 has a sense circuit 8, or filtering circuit, comprising an adder circuit 9 adding the voltages $V_{PHASE1}$, $V_{PHASE2}$ of each of the output nodes 20a and 20b of the first and second switches 3a and 3b. This brings the added voltage to an adder node 30.

The adder circuit 9 has, for each switch 3a and 3b, a resistance Rs interposed between each output 20a and 20b and the adder node 30. The sense circuit 8 comprises a capacitor $C_{CS}$ interposed between the adder node 30 and the voltage regulator output terminal 25 defining for the sense circuit 8 a filtering circuit feature.

The value of the resistances Rs and of the capacitor $C_{CS}$ are calculated to equal the term due to the time constant of the inductive circuit 5a, 5b. In this case, of the circuit $R_L$-L, i.e., $(L/R_L)=(Rs/2)*C_{CS}$.

Advantageously, the voltage regulator 100 comprises an amplifier 10, which is in this specific case an operational amplifier. The operational amplifier has a first input 11 connected to the adder node 30, and a second input 12 connected to the output terminal 25 by a suitable resistance $R_G$.

The operational amplifier 10 is in a converter configuration V/I. At the first non-inverting input 11 is the adder node 30, and at the second inverting input 12 or virtual ground is the resistance $R_G$. At the other end is the output voltage $V_{OUT}$. The operational amplifier 10 thus outputs a current signal $I_{CS}$ which is directly proportional to the sum of the current phases $I_{PHASE1}$, $I_{PHASE2}$ of the switches 3a and 3b, and thus to the total current $I_{OUT}$ output by the voltage regulator 100.

Moreover, the first input 11 and the second input 12 of the operational amplifier 10 are the only two pins CS+ e CS− used by a controller 15 to read the current $I_{OUT}$. The controller 15 is schematically represented in the figure and operates on the input voltage $V_{IN}$ of the first and second switch 3a and 3b to keep the sum of the current phases $I_{PHASE1}$, $I_{PHASE2}$ and thus the total current $I_{OUT}$ constant.

Figure 8:
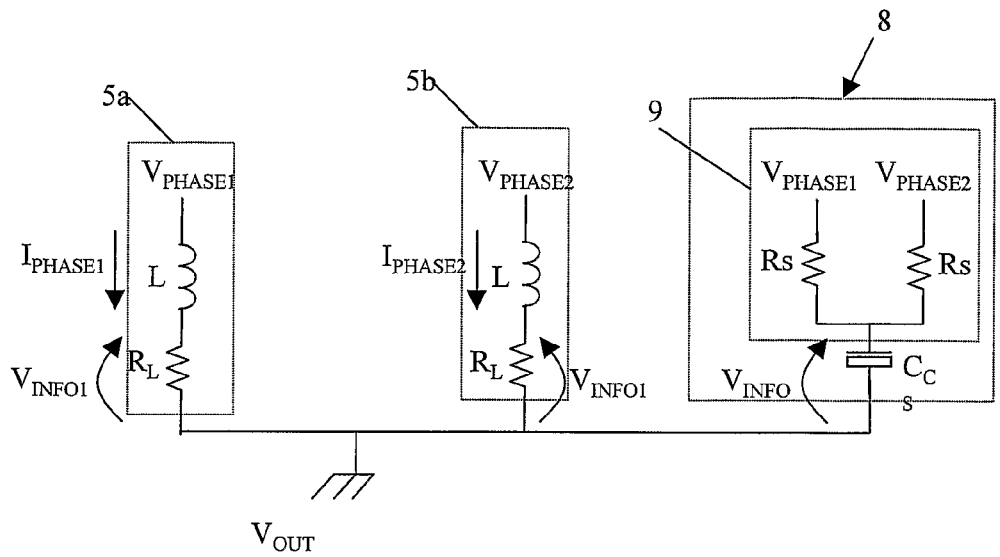
FIGS. 8 and 9 shows the voltage regulator of FIG. 6 in greater detail.
Figure 9:
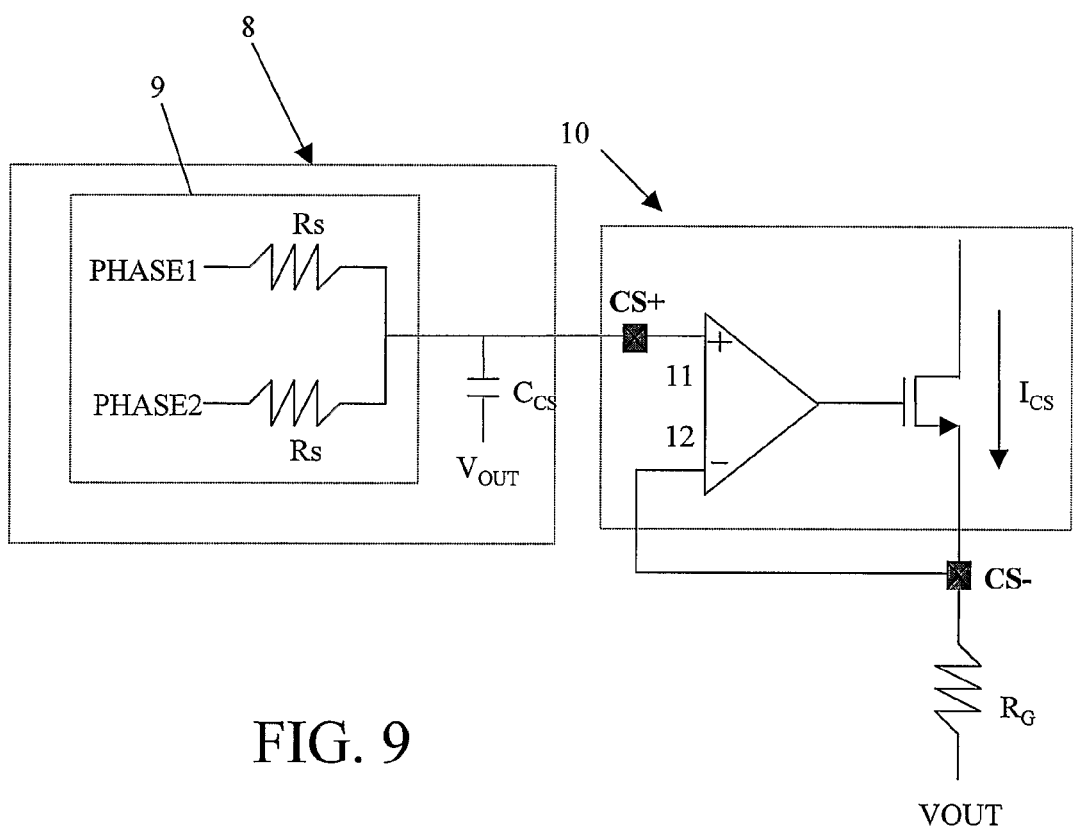

The operation of the voltage regulator 100 will now be analyzed, but the filtering, occurring in correspondence with the sense circuit 8, is examined first with reference to FIGS. 8 and 9. From the signal a ground voltage, and thus also $V_{OUT}$ at a ground voltage as particularly emphasized in FIG. 8.

The voltages $V_{INFO1}$ and $V_{INFO2}$ being created in correspondence with each resistance $R_L$ of the inductive circuit 5a and 5b are easily calculated, resulting as follows:

$$V_{INFO1}(s) = V_{PHASE1}(s) \cdot \frac{1}{1 + L/R_L}$$

-continued $$V_{INFO2}(s) = V_{PHASE2}(s) \cdot \frac{1}{1 + s \cdot L/R_L}$$

$$V_{INFO}(s) = \frac{V_{PHASE1}(s) + V_{PHASE2}(s)}{2} \cdot \frac{1}{1 + s \cdot \frac{R_P}{2} \cdot C_{CS}}$$

The important information signal is:

$$V_{INFO}|_{IDEALE}(s) = V_{INFO1}(s) + V_{INFO2}(s) = [V_{PHASE1}(s) + V_{PHASE2}(s)] \cdot \frac{1}{1 + L/R_L}$$

Obviously, by selecting the values of the resistance Rs and of the capacitor $C_{CS}$ to equal the term due to the time constant $R_L$-L of the inductive circuit 5a, 5b, the sizing relation (1) and the relation (2) concerning the voltage across the capacitor $C_{CS}$ are obtained as follows:

$$\frac{L}{R_L} = \frac{R_s}{2} \cdot C_{CS} \quad \text{time constant matching relation} \quad (1)$$

$$V_{INFO}(s) = \frac{V_{INFO}|_{IDEALE}(s)}{2} \quad \text{read information signal i.e.;} \quad (2)$$

$$V_{INFO} = \frac{R_L \cdot (I_{PHASE1} + I_{PHASE2})}{2}$$

FIG. 9 will now be analyzed, considering the operative case wherein the output voltage $V_{OUT}$ is different from the ground voltage. At the first positive input 11 of the operational amplifier 10, which is also the first pin CS+ of a controller 8, an average voltage occurs, corresponding to the following:

$$V_{CS+} = V_{INFO} + V_{OUT} = \frac{R_L \cdot (I_{PHASE1} + I_{PHASE2})}{2} + V_{OUT}$$

The presence of the operational amplifier 10 in a voltage-current converter configuration V/I and the presence of the resistance $R_G$ interposed between a second pin CS− of the controller 15, which is also the second input 12 or virtual ground of the amplifier 10, and the output voltage Vout, generates an output current signal $I_{CS}$ corresponding to the following:

$$I_{INFO} = \frac{R_L}{2 \cdot R_G} \cdot (I_{PHASE1} + I_{PHASE2}) \quad (3)$$

This is a signal directly proportional to the current phases $I_{PHASE1}$ and $I_{PHASE2}$, i.e., to the total current $I_{OUT}$. The main advantage of this embodiment is to obtain a current signal being directly proportional to the sum of the phase currents, and thus to the total current outputted by the voltage regulator requiring a minimum amount of external elements. These elements include an operational amplifier 10, N+1 resistances and an external capacitor $C_{CS}$. Moreover, only two PINs CS+ and CS− are required for the controller 15.

Figure 1:
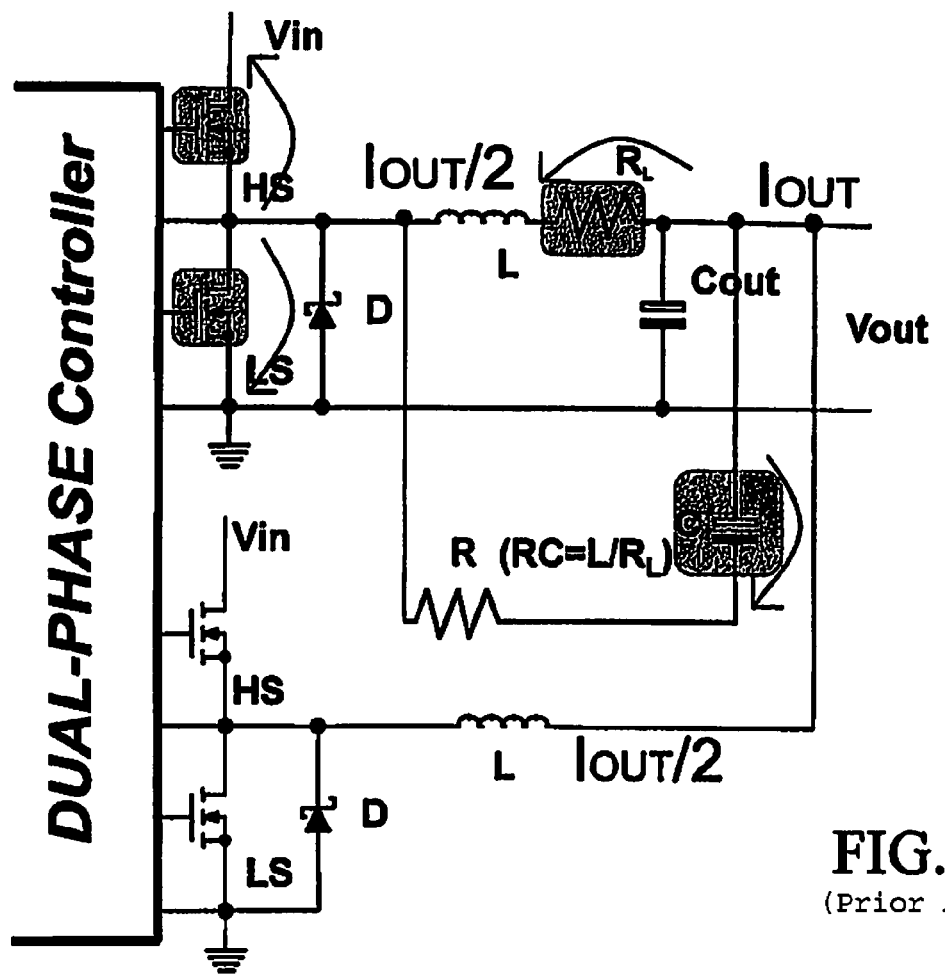
FIGS. 1 and 2 respectively show a standard dual-phase voltage regulator and an output current diagram according to the prior art.
Figure 2:
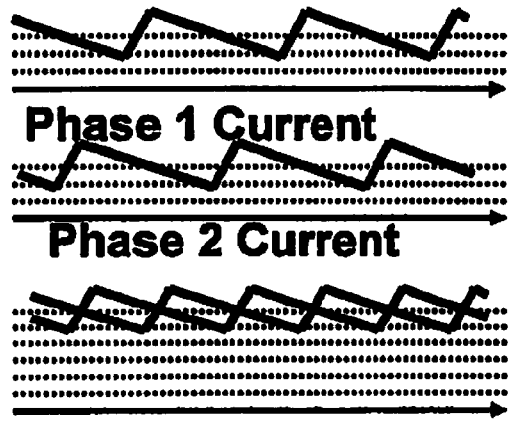
Figure 3:
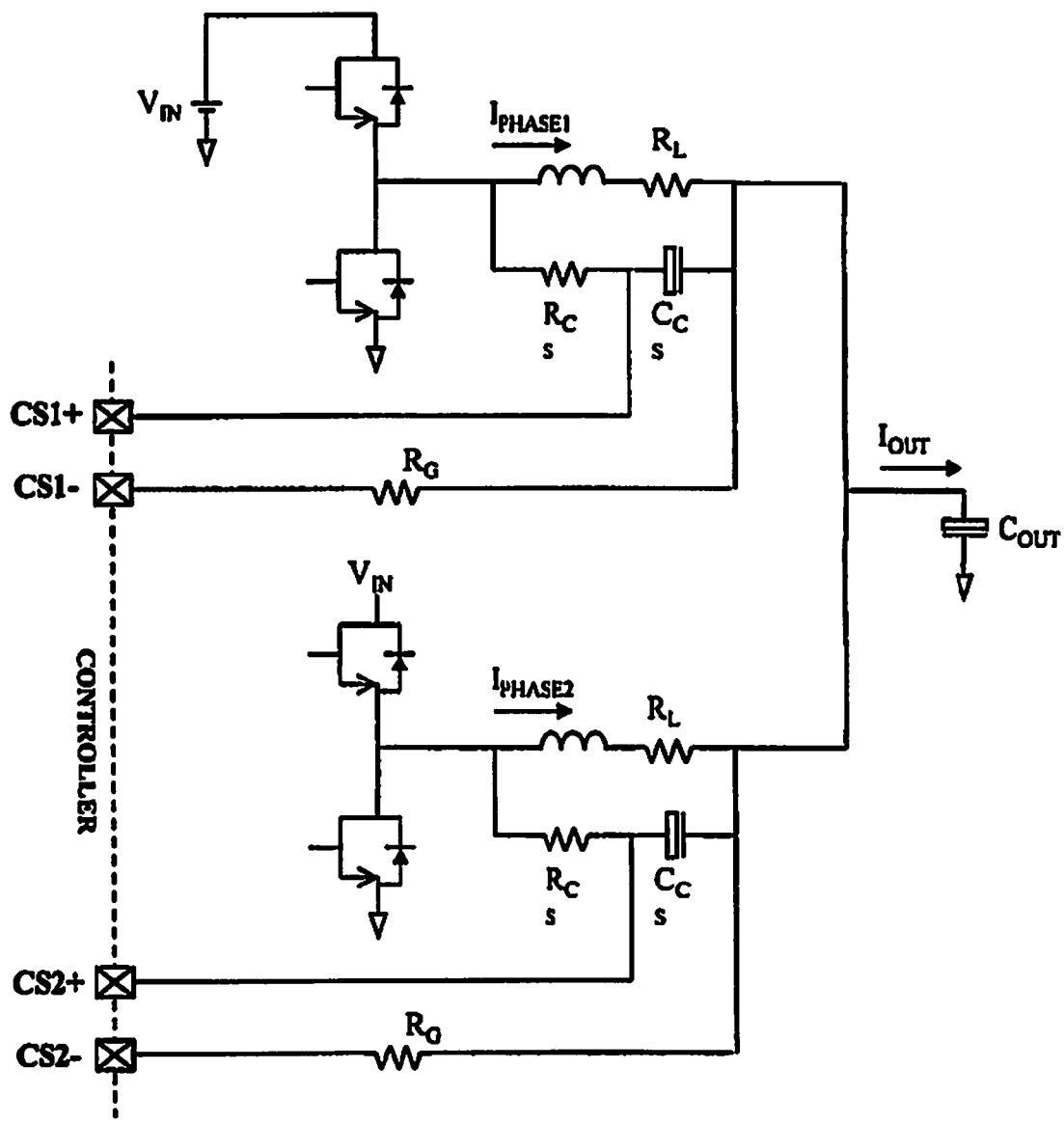
FIGS. 3 and 4 show two voltage regulators according to the prior art.
Figure 4:
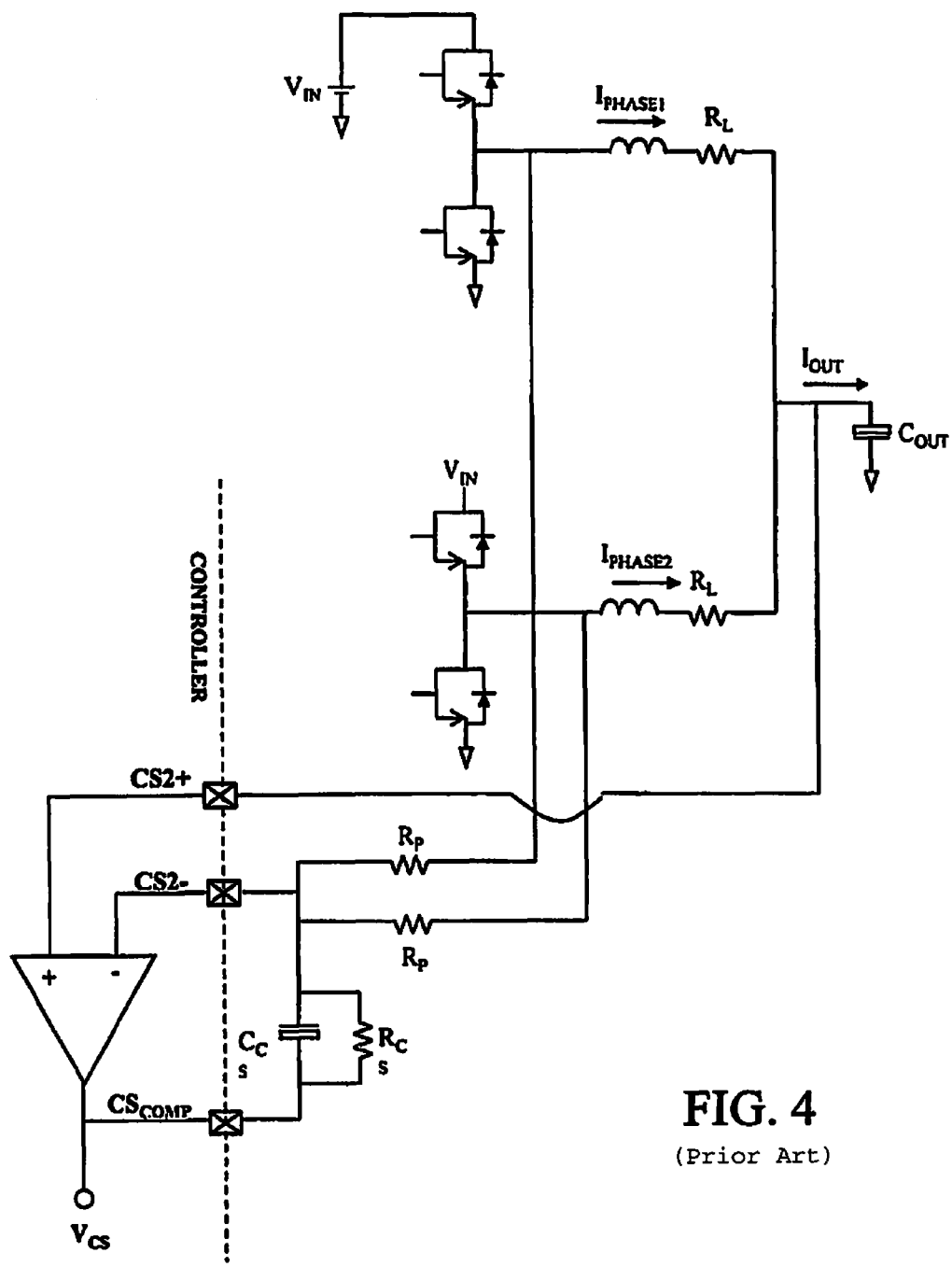
Figure 5:
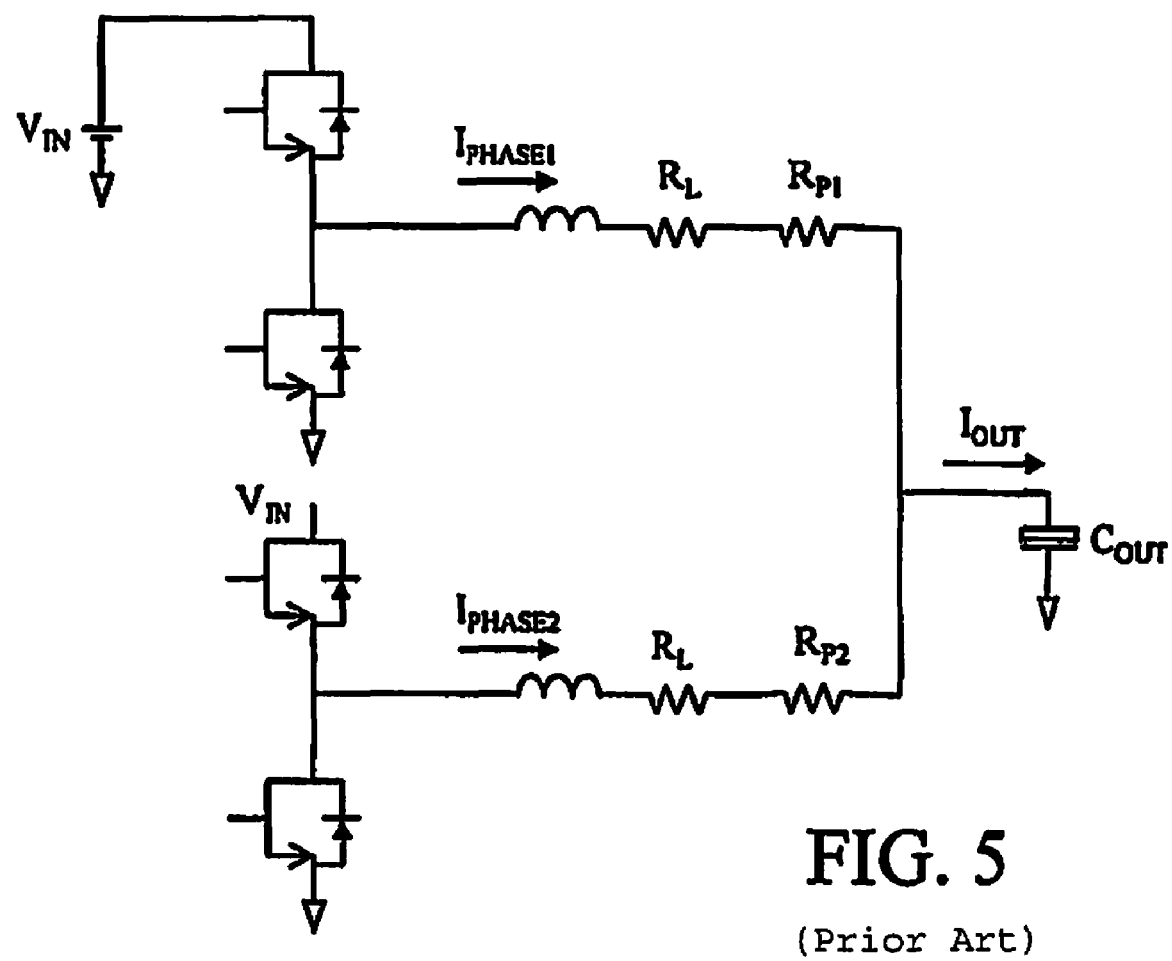
FIG. 5 shows a dual-phase voltage regulator when parasitic resistances due to the tracks on the board are present according to the prior art.

What has been described for a dual-phase regulator 100 can be generalized for the sizing of a sense circuit 8 for a voltage regulator with N switches 3, as shown in FIG. 5. The generalization is very simple. In fact, the circuit configuration remains substantially the same as the previous description, and for simplicity, a similar numbering to what has been previously indicated for the components having the same structure and functionality is kept.

In particular, each switch $3n$ added in parallel to the first and second switches $3a$ and $3b$ has similar connections, i.e., it provides a current phase $I_{PHASEN}$ which, through a respective inductive circuit $5n$ added to the phase currents $I_{PHASE1}$, $I_{PHASE2}$ in correspondence with the output terminal 25, generates a total current $I_{OUT}$.

The sense circuit 8 comprises an adder circuit 9 adding to the voltages $V_{PHASE1}$, $V_{PHASE2}$ of each of the output nodes 20$a$ and 20$b$ of the first and second switches $3a$ and $3b$, the voltage $V_{PHASEN}$ at an output node $20n$ of the added switch $3n$. The adder circuit 9 has the voltage being added at an adder node 30. The adder circuit 9 has for each added switch $3n$ a further resistance Rs interposed between each output $20n$ and the adder node 30.

Concerning the remaining circuitry, the configuration is similar to what has been previously described. In particular, the generalized formula (1) defines the formula (4) where N is the number of switches $3n$ of the voltage regulator 1 as follows:

$$\frac{L}{R_L} = \frac{R_S}{N} \cdot C_{CS} \quad \text{time constant matching relation} \quad (4)$$

$$I_{INFO} = \frac{R_L}{R_G} \cdot \frac{1}{N} \cdot \sum_{i=1}^{N} I_{PHASE,i} \quad \text{information signal} \quad (5)$$

Similarly, the formula (3) can be generalized defining the formula (5). It can be observed how the present approach allows a voltage regulator to be realized wherefrom the total outputted current can be read by using two pins independently from the number of existing current phases.

A programmability of the signal $I_{CS}$ is useful in the case of the voltage regulator droop function programmability, and is entrusted to the sizing of the resistance $R_G$. That is, this feature provides a desired output voltage proportionally to the current required by the load.

Advantageously, the voltage converter current reading is made completely fully differential on the inductance L, i.e., independent from the parasitic resistances due to the board copper tracks. In particular, a provided approach is shown in FIG. 10 for a dual-phase converter.

The circuit configuration remains substantially the same as the previous description, and for simplicity, a similar numbering to what has been previously indicated for the components having the same structure and functionality is kept.

Figure 10:
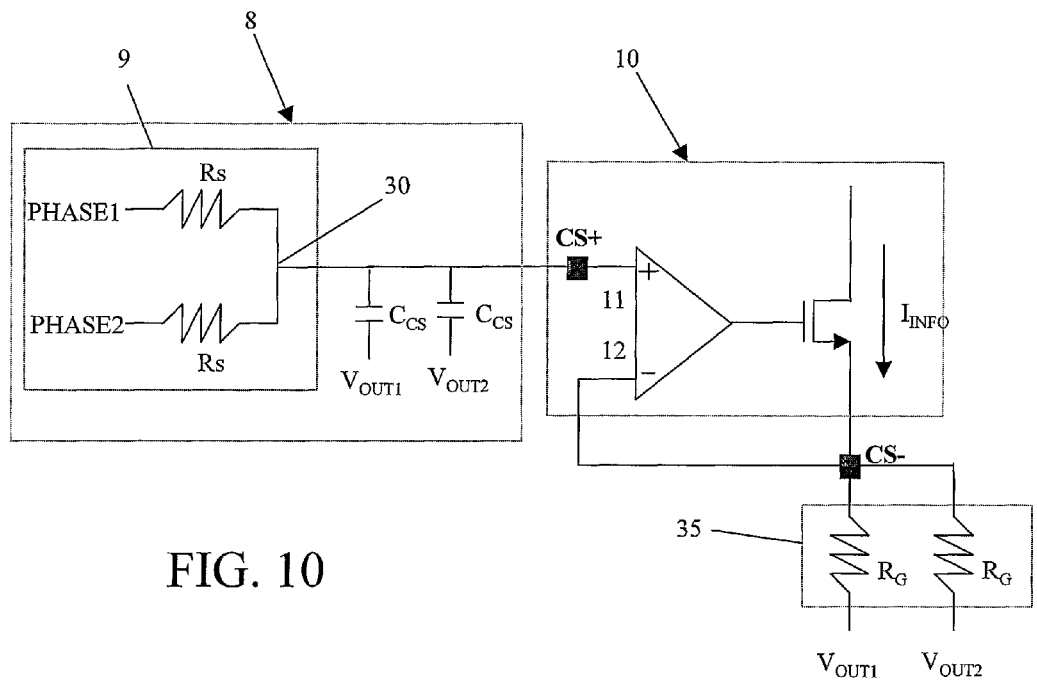
FIGS. 10 and 11 show similar details to FIGS. 8 and 9 of a further embodiment of a voltage regulator according to the present invention.

FIG. 10 according to the present embodiment has a sense circuit 8 or filtering circuit comprising an adder circuit 9 which adds the voltages $V_{PHASE1}$, $V_{PHASE2}$ outputted by each of the two phases of a voltage regulator. The adder circuit 9 outputs at an adder node 30 the voltages added $V_{PHASE1}$, $V_{PHASE2}$ by interposing a resistance $R_S$, one for each phase.

The sense circuit 8 comprises two capacitors $C_{CS}$, one for each phase, interposed between the adder node 30 and the output $V_{OUT1}$ and $V_{OUT2}$ of a first and second inductive circuit $5a$ and $5b$ of the voltage regulator. These capacitors $C_{CS}$ define for the sense circuit 8 a filtering circuit feature.

The voltage regulator, according to the present embodiment, comprises an amplifier 10, which in this specific case is an operational amplifier located in a voltage current configuration V/I. The operational amplifier 10 in a converter configuration V/I is connected to a first non-inverting terminal 11 at the adder note 30 and to a second inverting terminal 12 or virtual ground at a second adder circuit 35.

The second adder circuit 35 allows the voltages $V_{OUT1}$, $V_{OUT2}$ outputted by the first and second inductive circuits $5a$ and $5b$ of each of the two regulator phases to be added. This brings the added voltage to the second terminal 12 by interposing a resistance $R_G$.

The operational amplifier 10 thus outputs a current signal $I_{CS}$ directly proportional to the sum of the two current phases $I_{PHASE1}$, $I_{PHASE2}$ and thus to the total current $I_{OUT}$ output by the voltage regulator according to the following:

$$I_{INFO} = \frac{R_L}{R_G} \cdot (I_{PHASE1} + I_{PHASE2})$$

Figure 11:
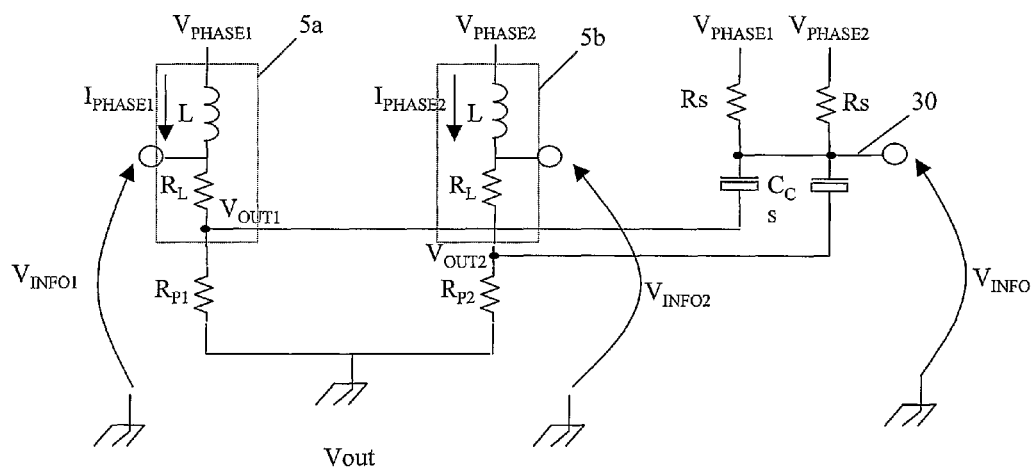

Moreover, by using only two pins CS+ and CS− respectively connected to the first input 11 and to the second input 12 of the operational amplifier 10, it is advantageously possible to read the voltage regulator current $I_{OUT}$. The voltage regulator operation for the described configuration will now be analyzed. The filtering occurring in correspondence with the sense circuit 8 is first examined, with reference to FIG. 11.

Obviously, each of the two regulator phases has a coil network or inductive circuit $5a$ and $5b$ comprising an inductance L in series with a parasitic resistance $R_L$. The presence of the tracks on the board generates a resistance, indicated with $R_{P1}$ and $R_{P2}$ respectively, located in series with the resistance $R_L$. From a signal point of view, it can be considered that the voltage regulator output terminal $V_{OUT}$ is set at a ground voltage.

The voltages $V_{INFO1}$ and $V_{INFO2}$ created at the output of the inductance L of each of the two phases, required for the current reading, are easily calculated according to the following:

$$V_{INFO1}(s) = V_{PHASE1}(s) \cdot \frac{1}{1+s \cdot L/R_L} + V_{OUT1} \cdot \frac{s \cdot L/R_L}{1+s \cdot L/R_L}$$

$$V_{INFO2}(s) = V_{PHASE2}(s) \cdot \frac{1}{1+s \cdot L/R_L} + V_{OUT2} \cdot \frac{s \cdot L/R_L}{1+s \cdot L/R_L}$$

$$V_{INFO}(s) = \frac{V_{PHASE1}(s) + V_{PHASE2}(s)}{2} \cdot \frac{1}{1+s \cdot R_S \cdot C_{CS}} + \frac{V_{OUT1}(s) + V_{OUT2}(s)}{2} \cdot \frac{s \cdot R_S \cdot C_{CS}}{1+s \cdot R_S \cdot C_{CS}}$$

Therefore, on average the following will result:

$$V_{INFO} = \frac{R_L \cdot (I_{PHASE1} + I_{PHASE2})}{2} + \frac{(V_{OUT1} + V_{OUT2})}{2}$$

which is the voltage at the node 30, i.e., at the non-inverting terminal 11 of the operational amplifier 10. The value of this voltage $V_{INFO}$ is completely fully differential, i.e., independent from the value of the parasitic resistances $R_{P1}$ and $R_{P2}$ due to the board copper tracks.

The presence of the operational amplifier 10 in a voltage-current converter configuration V/I and the presence of the resistances $R_G$ interposed between the inverting terminal of the amplifier 10, with virtual ground, and the respective output voltages $V_{OUT1}$ and $V_{OUT2}$ of the inductive circuits $5a$ and 5b, generates an output current signal $I_{CS}$ corresponding to the following:

$$I_{INFO} = \frac{R_L}{R_G} \cdot (I_{PHASE1} + I_{PHASE2})$$

Figure 12:
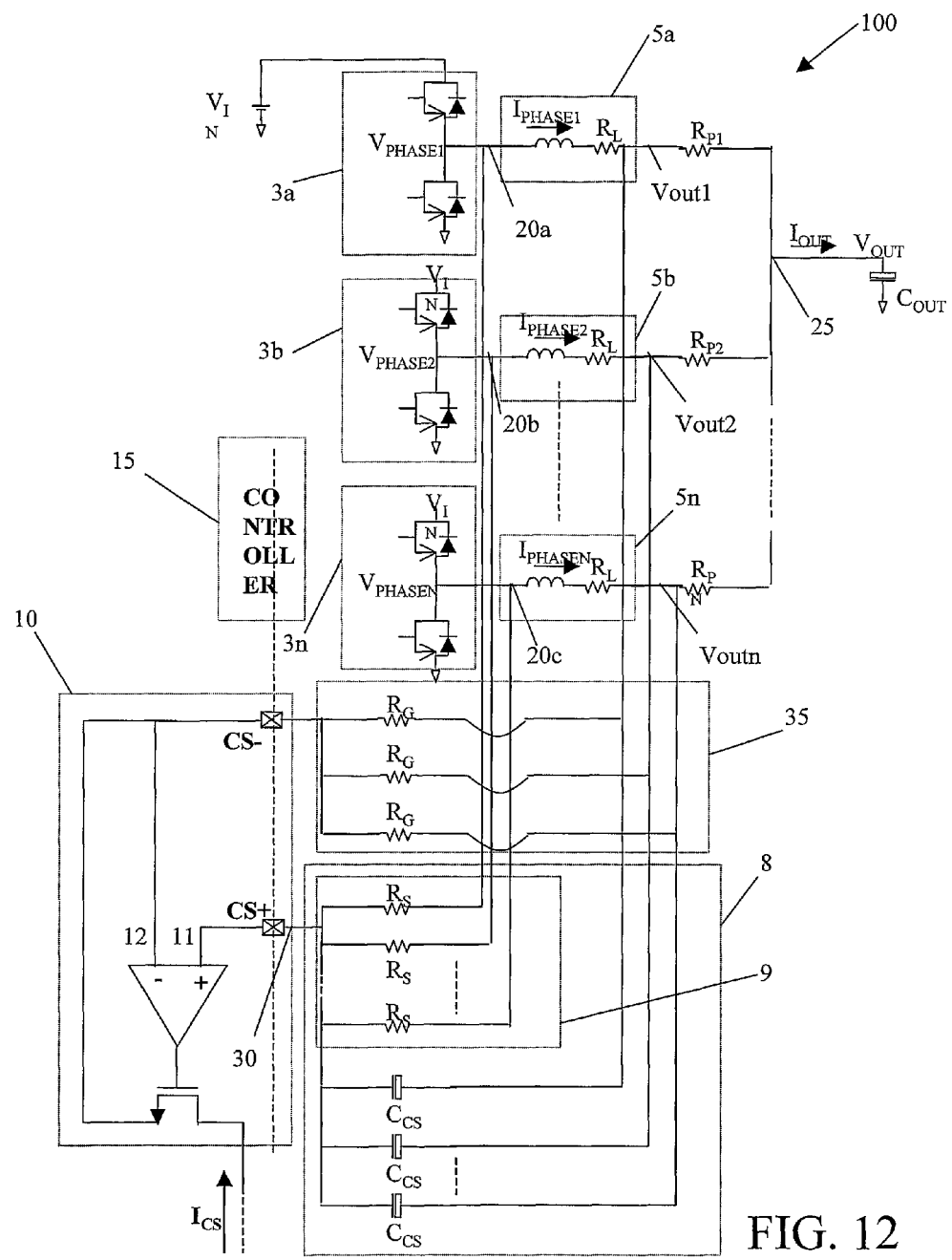
FIG. 12 shows an N-phase voltage regulator with the approach shown in FIG. 10 being applied according to the present invention.

This current reading is thus fully differential and the provided approach allows it to be sensed by using only two pins. Obviously, the described approach can be applied to an N-phase regulator, such as the one shown in FIG. 12, for example.

The shown multiphase voltage regulator 100 is of the type suitable to provide a regulated output voltage $V_{OUT}$ on an output terminal 25 and of the type comprising a plurality of N switches $3a, 3b, \ldots, 3n$ located in parallel to each other. Each is intended to provide respective current phases $I_{PHASE1}$, $I_{PHASE2}, \ldots, I_{PHASEN}$ added to each other to generate a total current for a general load $C_{OUT}$ connected to the output terminal 25.

The regulator 100 has also a corresponding plurality of N inductive circuits $5a, 5b, \ldots, 5n$. Each one is interposed between an output node $20a, 20b, \ldots, 20n$ of each of the N switches $3a, 3b, \ldots, 3n$ and the output terminal 25.

Moreover, the regulator 100 has a sense circuit 8 comprising an adder circuit 9 to add the voltages of each of the output nodes $20a, 20b, \ldots, 20n$ of the N switches $3a, 3b, \ldots, 3n$ and to bring the added voltage at an adder node 30 output by the sense circuit 8.

The adder circuit 9 comprises, for each of the switches $3a, 3b, \ldots, 3n$, a resistance $R_S$ is interposed between each output node $20a, 20b, \ldots, 20n$ and the adder node 30. Moreover, the sense circuit 8 comprises for each of the N inductive circuits $5a, 5b, \ldots, 5n$ a capacitor $C_{CS}$ interposed between the output of the N inductive circuits $5a, 5b, \ldots, 5n$ and the adder node 30, which define for the sense circuit 8 a filtering feature.

Furthermore, the regulator 100 comprises an amplifier circuit 10 with a first non-inverting terminal 11 connected to the adder node 30 and with a second inverting terminal 12 connected to the output terminal 25, to output a current $I_{CS}$ proportional to the total current $I_{OUT}$.

The second terminal 12 of the amplifier 10 is connected to a second adder circuit 35 to add the voltages $V_{OUT1}$, $V_{OUT2}, \ldots, V_{OUTN}$ output by the plurality of N inductive circuits $5a, 5b, \ldots, 5n$ and bring the added voltage to the second terminal 12. The first 11 and the second terminals 12 of the amplifier 10 define for the regulator 100 two possible PINs, CS+ and CS− respectively, for a controller 15 suitable to identify the output voltage of the regulator 100.

The present embodiment takes into consideration possible parasitic resistances on the regulator 100. This is because of the board copper tracks, identified with a plurality of resistances $R_{P1}, R_{P2}, \ldots, R_{PN}$ located in series with the resistance $R_L$ of the N inductive circuits $5a, 5b, \ldots, 5n$ and the output node 25 of the regulator 100.

By generalising now the above-mentioned relations for a similar dual-phase regulator, the following is obtained:

$$\frac{L}{R_L} = R_S \cdot C_{CS} \quad \text{time constant matching relation}$$

$$I_{INFO} = \frac{R_L}{R_G} \cdot \sum_{i=1}^{N} I_{PHASE,i} \quad \text{information signal}$$

where i is the number of phases.

From the relation for determining $I_{INFO}$ it is possible to observe how the programmability of the signal $I_{INFO}$ is entrusted to the sizing of the resistance $R_G$ useful in the droop function programmability case.

The main advantage of the present embodiment is thus to obtain a current signal being directly proportional to the sum of the phase currents, and thus to the total current output by the voltage regulator. The embodiment is completely fully differential, independent from the board parasitic resistances, and requires a minimum amount of external elements. External elements include an operational amplifier 10, 2N resistances and N external capacitors $C_{CS}$, for example. This is while the provided current value is sensed using only two PINs CS+ and CS−.

Obviously, the current signal which can be read by the sensing of the two pins CS+ and CS− can be used to generate the droop function, or in any other request needing information about the total current output by the completely fully differential regulator.

Figure 13:
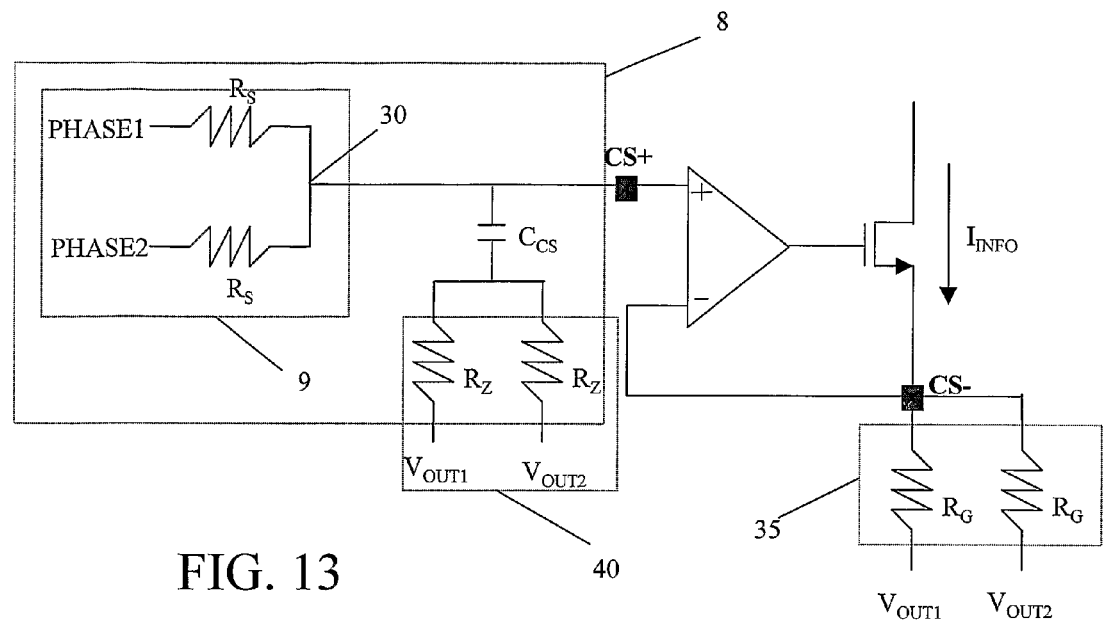
FIGS. 13 and 14 show similar details to FIGS. 8 and 9 of a further embodiment of a voltage regulator according to the present invention.

A further embodiment suitable to sense the total current value provided by the regulator by using only two pins and being completely fully differential by using only one output capacitor is shown in FIG. 13. The following is also provided:

$$V_{INFO1}(s) = V_{PHASE1}(s) \cdot \frac{1}{1+s\cdot\frac{L}{R_L}} + V_{OUT1} \cdot \frac{s\cdot\frac{L}{R_L}}{1+s\cdot\frac{L}{R_L}}$$

$$V_{INFO2}(s) = V_{PHASE2}(s) \cdot \frac{1}{1+s\cdot\frac{L}{R_L}} + V_{OUT2} \cdot \frac{s\cdot\frac{L}{R_L}}{1+s\cdot\frac{L}{R_L}}$$

$$V_{INFO}(s) = \frac{V_{PHASE1}(s) + V_{PHASE2}(s)}{2} \cdot \frac{1+s\cdot\frac{R_Z}{2}\cdot C_{CS}}{1+s\cdot\left(\frac{R_S+R_Z}{2}\right)\cdot C_{CS}} +$$

$$\frac{V_{OUT1}(s) + V_{OUT2}(s)}{2} \cdot \frac{s\cdot\frac{R_S}{2}\cdot C_{CS}}{1+s\cdot\left(\frac{R_S+R_Z}{2}\right)\cdot C_{CS}}$$

Figure 14:
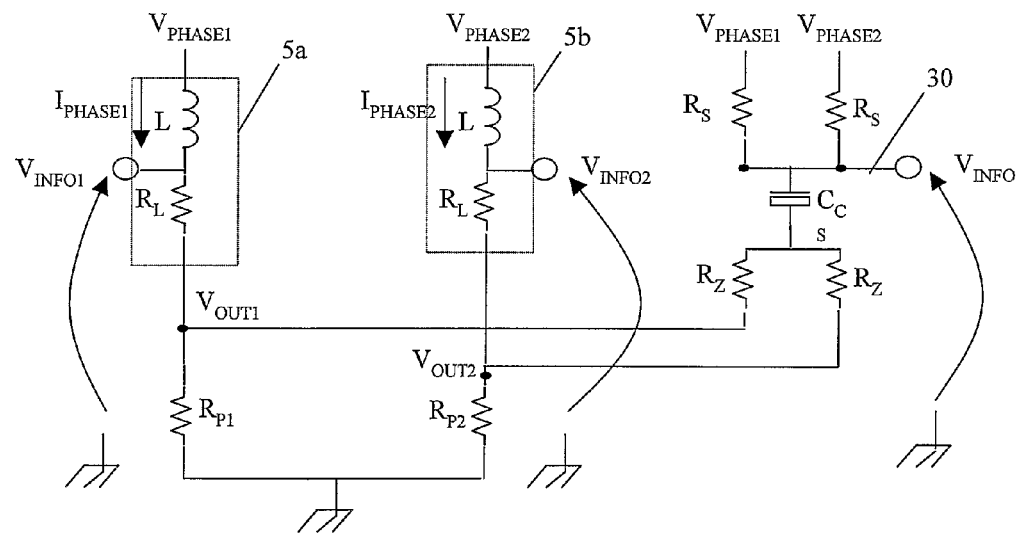

This embodiment is substantially similar to the above-described embodiment with a variation on the filtering feature of the sense circuit 8. In fact, it has a single capacitor $C_{CS}$. Advantageously, the sense circuit 8 has a single capacitor connected to the node 30 at the output of the adder 9, while the other end of the capacitor $C_{CS}$ is connected to an adder circuit 40 to add the voltages $V_{OUT1}$ and $V_{OUT2}$ outputted by the first and second inductive circuits 5a and 5b, of each phase, by interposing a resistance $R_Z$. By analysing the voltage regulator operation according to the present embodiment, shown in FIG. 14, the following is provided:

$$V_{INFO1}(s) = V_{PHASE1}(s) \cdot \frac{1}{1+s\cdot\frac{L}{R_L}} + V_{OUT1} \cdot \frac{s\cdot\frac{L}{R_L}}{1+s\cdot\frac{L}{R_L}}$$

$$V_{INFO2}(s) = V_{PHASE2}(s) \cdot \frac{1}{1+s\cdot\frac{L}{R_L}} + V_{OUT2} \cdot \frac{s\cdot\frac{L}{R_L}}{1+s\cdot\frac{L}{R_L}}$$

-continued $$V_{INFO}(s) = \frac{V_{PHASE1}(s) + V_{PHASE2}(s)}{2} \cdot \frac{1 + s \cdot \frac{R_Z}{2} \cdot C_{CS}}{1 + s \cdot \left(\frac{R_S + R_Z}{2}\right) \cdot C_{CS}} +$$

$$\frac{V_{OUT1}(s) + V_{OUT2}(s)}{2} \cdot \frac{s \cdot \frac{R_S}{2} \cdot C_{CS}}{1 + s \cdot \left(\frac{R_S + R_Z}{2}\right) \cdot C_{CS}}$$

assuming that a result is as follows:

$$\frac{L}{R_L} = \frac{R_S}{2} \cdot C_{CS}$$

$$R_S \gg R_Z$$

$$V_{INFO}(s) = \frac{V_{PHASE1}(s) + V_{PHASE2}(s)}{2} \cdot \frac{1 + s \cdot \frac{R_Z}{2} \cdot C_{CS}}{1 + s \cdot \frac{L}{R_L}} +$$

$$\frac{V_{OUT1}(s) + V_{OUT2}(s)}{2} \cdot \frac{s \cdot \frac{L}{R_L}}{1 + s \cdot \frac{L}{R_L}}$$

From the relation it can be observed how by selecting such values of the resistance $R_Z$ and of the capacitor $C_{CS}$, that the zero generated therefrom occurs at much higher frequencies than the current ripple current. That is, at least a decade later a correct current measure is obtained.

Therefore, at the current ripple frequency, corresponding to $2f_{SW}$ in the dual-phase regulator case, and $N^*f_{SW}$ for a general N-phase regulator, the voltage value $V_{INFO}$ corresponds to the following:

$$V_{INFO}(s) \cong \frac{V_{INFO1} + V_{INFO2}}{2}$$

and, thus the voltage value at the positive input of the operational amplifier 10 corresponds to the following:

$$V_{INFO} \cong \frac{R_L \cdot (I_{PHASE1} + I_{PHASE2})}{2} + \frac{(V_{OUT1} + V_{OUT2})}{2}$$

while the current value $I_{INFO}$ output by the operational amplifier corresponds to the following:

$$I_{INFO} = \frac{R_L}{R_G} \cdot (I_{PHASE1} + I_{PHASE2})$$

A considerable advantage of the embodiment being provided is to sense the current outputted by a regulator simply by using two pins, an operational amplifier 10, as well as six resistances and only one external capacitor. However, in the meantime a current signal directly proportional to the sum of the phase currents is obtained by a fully differential current reading, independent from the parasitic resistances created for the tracks which can be in the board.

Figure 15:
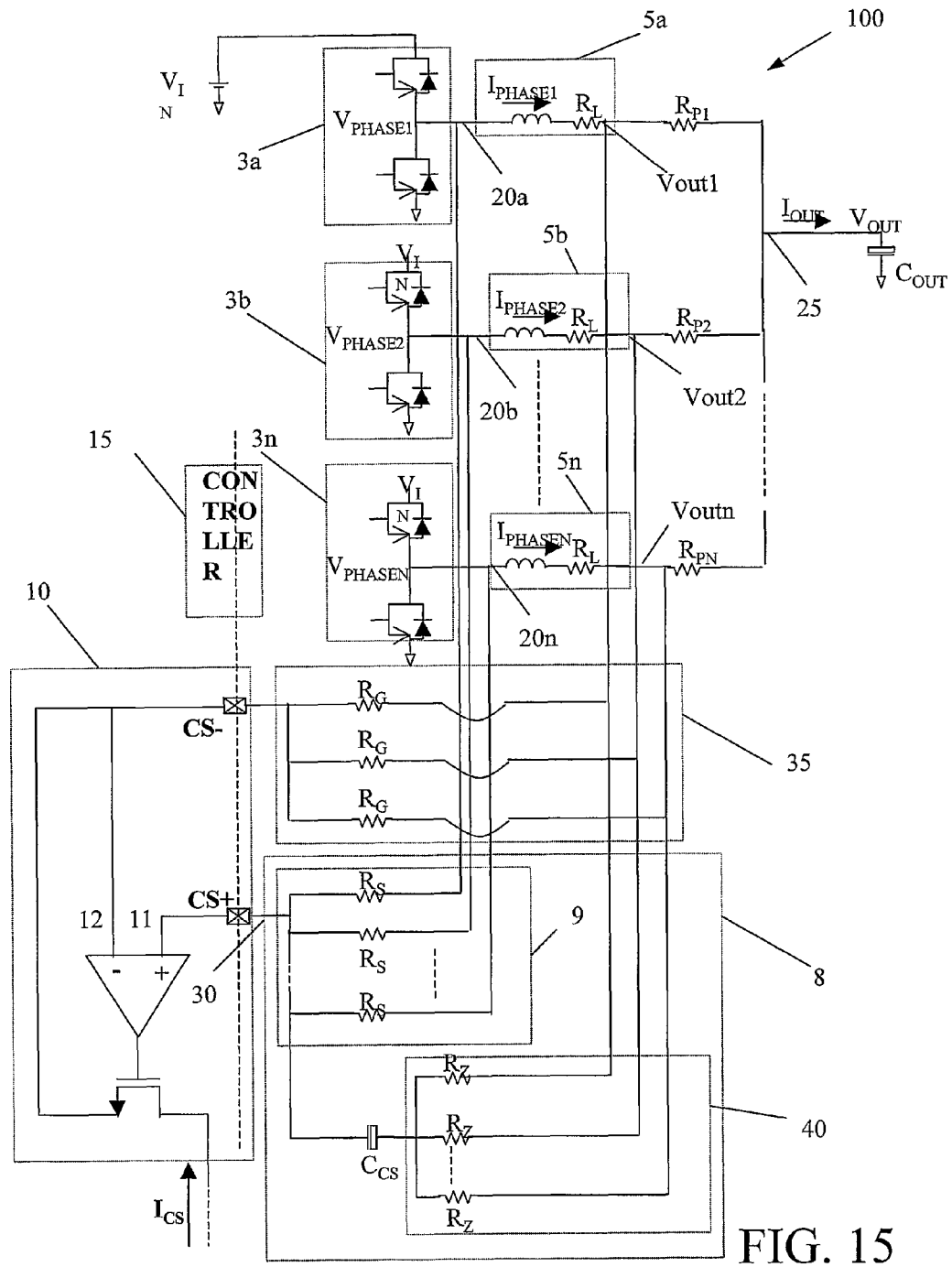
FIG. 15 shows an N-phase voltage regulator with the approach shown in FIG. 13 being applied.

Obviously, the present embodiment can be applied to an N-phase voltage regulator as particularly shown in FIG. 15. The shown multiphase voltage regulator 100 is of the type suitable to provide an output voltage $V_{OUT}$ on an output terminal 25 and of the type comprising a plurality of N switches 3a 3b, . . . , 3n located in parallel to each other. Each switch is intended to provide respective current phases $I_{PHASE1}, I_{PHASE2}, \ldots, I_{PHASEN}$ added to each other to generate a total current $I_{OUT}$ for a general load $C_{OUT}$ connected to the output terminal 25.

The regulator 100 also has a corresponding plurality of N inductive circuits 5a, 5b, . . . , 5n, each interposed between an output node 20a, 20b, . . . , 20n of each of the N switches 3a, 3b, . . . , 3n and the output terminal 25. Moreover, the regulator 100 has a sense circuit 8 comprising an adder circuit 9 to add the voltages of each of the output nodes 20a, 20b, . . . , 20n of the N switches 3a, 3b, . . . , 3n and to bring the added voltage at an adder node 30 output by the sense circuit 8.

The adder circuit 9 comprises, for each of the switches 3a, 3b, . . . , 3n, a resistance Rs interposed between each output node 20a, 20b, . . . , 20n and the adder node 30. Moreover, the sense circuit 8 comprises an adder circuit 40 to add the voltages outputted by the N inductive circuits 5a, 5b, . . . , 5n by way of a resistance $R_Z$, and to bring the added voltage at the input of a capacitor $C_{CS}$ which has the output connected to the adder 30. The capacitor $C_{CS}$ defines for the sense circuit 8 a filtering feature.

Furthermore, the regulator 100 comprises an amplifier circuit 10 with a first non-inverting terminal 11 connected to the adder node 30 and with a second inverting terminal 12 connected to the output terminal 25, to output a current $I_{CS}$ proportional to the total current $I_{OUT}$.

The second terminal 12 of the amplifier 10 is connected to a second adder circuit 35 to add the voltages $V_{OUT1}$, $V_{OUT2}, \ldots, V_{OUTN}$ output by the plurality of N inductive circuits 5a, 5b, . . . , 5n and bring the added voltage to the second terminal 12. The first 11 and second terminal 12 of the amplifier 10 define for the regulator 100 two possible PINS, CS+ and CS− respectively, for a controller 15 suitable to identify the output voltage of the regulator 100.

The present embodiment takes into consideration possible parasitic resistances being on the regulator 100 because of the board copper tracks identified with a plurality of resistances $R_{P1}, R_{P2}, \ldots, R_{PN}$ located in series with the resistance $R_L$ of the N inductive circuits 5a, 5b, . . . , 5n and the output node 25 of the regulator 100.

Considering the above-mentioned relations for the dual-phase case generalized for the N-phase converter, the following are obtained:

$$\frac{L}{R_L} = \frac{R_S \cdot C_{CS}}{N} \quad \text{time constant matching relation}$$

$$I_{INFO} = \frac{R_L}{R_G} \cdot \sum_{i=1}^{N} I_{PHASE,i} \quad \text{information signal}$$

$$\frac{R_Z}{N} \cdot C_{CS} < \frac{1}{2 \cdot \pi \cdot 10 \cdot N \cdot f_{SW}} \rightarrow R_Z \cdot C_{CS} < \frac{1}{20 \cdot \pi \cdot f_{SW}}$$

The relation which should necessarily be satisfied on the sizing of the resistance $R_Z$ is independent from the number N of regulator phases, since the current ripple frequency is equal to $N \cdot f_{SW}$ while the zero-equivalent resistance is equal to $R_Z/N$.

A main advantage of the voltage regulators realized according to the present embodiments is to directly read a current value being proportional to the total current value provided by the voltage regulator.

A further considerable advantage is to read the value being proportional to the total current value simply by means of two pins, independently from the number of the existing current phases.

A further advantage of the voltage regulator is to provide a reliable, simple and economical circuit structure requiring a minimum of external components, i.e., (N+1) external resistances, a capacitor and a single amplifier. In particular, the single capacitor may be very reliable type.

Another advantage is to provide a compact structure. This requires a minimum surface for the integration thereof in a silicon chip and for the assembly thereof in a board.

An advantage of the voltage regulator is due to the reading precision with respect to the temperature. In fact, the reading of the single current phase is performed on the parasitic resistance $R_L$ of the inductance $L$.

A further considerable advantage is due to the fact that sensed current measures are fully differential. That is, the measurements are not influenced by the value of the parasitic resistances on the application boards due to the board copper tracks.

The advantage linked to the fact of programming the droop function by regulating the value of the single resistance $R_G$ or of N resistances $R_G$, all with the same value, in a particularly compact embodiment provides a very economical configuration. This is obtained by using a filtering determined by the presence of N resistances $R_S$ and N capacitors $C_{CS}$ or a single capacitor $C_{CS}$ and N resistances $R_Z$.

That which is claimed:

1. A multiphase voltage regulator comprising:
   an output terminal;
   a plurality of switches in parallel to each other for providing a plurality of current phases, the plurality of current phases being added together to generate a total current for a load coupled to said output terminal;
   a plurality of inductive circuits coupled between respective outputs of said plurality of switches and said output terminal, each inductive circuit comprising an inductance and a resistance coupled to said inductance;
   a sense circuit comprising a first adder node, and a first adder circuit comprising a plurality of resistances connected between said first adder node and the respective outputs of said plurality of switches for adding voltages on the respective outputs of said plurality of switches;
   a second adder node and a second adder circuit coupled to said second adder node, said second adder circuit comprising a plurality of resistances connected to respective outputs of said plurality of inductive circuits for adding voltages output by said plurality of inductive circuits, with said plurality of resistances being separate from the resistance of each inductive circuit;
   an amplifier circuit having a first input connected to said first input of said sense circuit for receiving the added voltage from said sense circuit, and a second input connected to said second adder node for receiving the added voltages output by said plurality of inductive circuits and an output for generating a current proportional to the total current; and
   a controller comprising first and second pins for reading the total current, said first and second pins respectively coupled to said first and second inputs of said amplifier circuit, with said controller operating on an input voltage of said plurality of switches to keep the total current constant.

2. A multiphase voltage regulator according to claim 1, wherein said sense circuit further comprises a capacitor coupled between said first adder node and said output terminal.

3. A multiphase voltage regulator according to claim 2, wherein a value of said plurality of resistances $R_s$ and a value of said capacitor $C_{cs}$ in said sense circuit are selected based on the following:

$$\frac{L}{R_L} = \frac{R_S}{N} \cdot C_{CS}$$

wherein N is a number of said plurality of switches, and L and $R_L$ are inductance and resistance values in a respective inductance circuit.

4. The multiphase voltage regulator according to claim 3, wherein said amplifier circuit generates an output current signal directly proportional to the plurality of current phases provided by said plurality of switches and to the total current according to the following:

$$I_{INFO} = \frac{R_L}{R_G} \cdot \frac{1}{N} \cdot \sum_{i=1}^{N} I_{PHASE,i}$$

wherein N is a number of said plurality of switches, $R_L$ is a resistance value in a respective inductance circuit, $R_G$ is a resistance value of said resistance coupled to said output terminal, and $I_{PHASE,i}$ is a current phase corresponding to one of said plurality of switches.

5. The multiphase voltage regulator according to claim 1, wherein said amplifier circuit comprises an operational amplifier configured as a voltage-current converter, the first input thereof corresponding to a non-inverting input and the second input thereof corresponding to a second inverting input.

6. A multiphase voltage regulator comprising:
   an output terminal for providing a regulated output voltage to a load coupled thereto;
   a plurality of switches in parallel to each other for providing a plurality of current phases, the plurality of current phases being added together to generate a total current for said output terminal;
   a plurality of inductive circuits coupled between respective outputs of said plurality of switches and said output terminal;
   a sense filtering circuit comprising
      a first adder node,
      a first adder circuit comprising a plurality of resistances connected between said first adder node and the respective outputs of said plurality of switches, and
      a plurality of capacitors connected to said first adder node and filtering voltages on the respective outputs of said plurality of switches, the filtered voltages being added together for outputting an added and filtered voltage at said first adder node; and
   a second adder node and a second adder circuit coupled to said second adder node, said second adder circuit comprising a plurality of resistances connected to respective outputs of said plurality of inductive circuits for adding voltages output by said plurality of inductive circuits; and
   an amplifier circuit having first and second inputs, said first input connected to said first adder node of said sense filtering circuit, and said second input connected to said second adder node, and an output for outputting a current proportional to the total current of said output terminal.

7. The multiphase voltage regulator according to claim 6, wherein said plurality of capacitors is connected to said output terminal.

8. The multiphase voltage regulator according to claim 7, wherein a value of said resistances $R_S$ in said first adder circuit and a value of said capacitor $C_{CS}$ are calculated according to the following:

$$\frac{L}{R_L} = \frac{R_S}{N} \cdot C_{CS}$$

wherein N is a number of said plurality of switches, and L and $R_L$ are inductance and resistance values in a respective inductance circuit.

9. The multiphase voltage regulator according to claim 6, wherein said amplifier circuit comprises an operational amplifier configured as a voltage-current converter.

10. The multiphase voltage regulator according to claim 6, wherein said amplifier circuit generates an output current signal directly proportional to the plurality of current phases of said plurality of switches and to the total current according to the following:

$$I_{INFO} = \frac{R_L}{R_G} \cdot \frac{1}{N} \cdot \sum_{i=1}^{N} I_{PHASE,i}$$

wherein N is a number of said plurality of switches, $R_L$ is a resistance value in a respective inductance circuit, $R_G$ is a resistance value of said at least one resistance coupled to said output terminal, and $I_{PHASE,i}$ is a current phase corresponding to one of said plurality of switches.

11. The multiphase voltage regulator according to claim 6, wherein said resistance $R_Z$ in said second adder is according to the following:

$$\frac{R_Z}{N} \cdot C_{CS} < \frac{1}{2 \cdot \pi \cdot 10 \cdot N \cdot f_{SW}} \rightarrow R_Z \cdot C_{CS} < \frac{1}{20 \cdot \pi \cdot f_{SW}}$$

where $f_{SW}$ is a current ripple frequency, and N is a number of said plurality of switches.

12. A method for making a multiphase voltage regulator comprising:
  forming an output terminal for providing a regulated output voltage to a load;
  coupling a plurality of switches in parallel to each other for providing a plurality of current phases, the plurality of current phases being added together to generate a total current for the output terminal;
  coupling a plurality of inductive circuits between respective outputs of the plurality of switches and the output terminal, each inductive circuit comprising an inductance and a resistance coupled to the inductance;
  forming a sense circuit for adding voltages on the outputs of the plurality of switches, the sense circuit comprising a first adder node, and a first adder circuit comprising a plurality of resistances connected between the first adder node and the respective outputs of the plurality of switches;
  coupling a second adder circuit to a second adder node, the second adder circuit comprising a plurality of resistances connected to respective outputs of the plurality of inductive circuits for adding voltages output by the plurality of inductive circuits, with the plurality of resistances being separate from the resistance of each inductive circuit;
  forming an amplifier circuit having a first input connected to the first input of the sense circuit for receiving the added voltage from the sense circuit, and a second input connected to the second adder node for receiving the added voltages output by the plurality of inductive circuits, and an output for generating a current proportional to the total current; and
  providing a controller comprising first and second pins for reading the total current, the first and second pins respectively coupled to the first and second inputs of the amplifier circuit, with the controller operating on an input voltage of the plurality of switches to keep the total current constant.

13. The method according to claim 12, wherein the sense circuit further comprises a capacitor coupled between the first adder node and the output terminal.

14. The method according to claim 13, wherein a value of the plurality of resistances $R_S$ and a value of the capacitor $C_{CS}$ in the sense circuit are selected based on the following:

$$\frac{L}{R_L} = \frac{R_S}{N} \cdot C_{CS}$$

wherein N is of the plurality of switches, and L and $R_L$ are inductance and resistance values in a respective inductance circuit.

15. The method according to claim 14, wherein the amplifier circuit generates an output current signal directly proportional to the plurality of current phases provided by the plurality of switches and to the total current according to the following:

$$I_{INFO} = \frac{R_L}{R_G} \cdot \frac{1}{N} \cdot \sum_{i=1}^{N} I_{PHASE,i}$$

wherein N is a number of the plurality of switches, $R_L$ is a resistance value in a respective inductance circuit, $R_G$ is a resistance value of the resistance coupled to the output terminal, and $I_{PHASE,i}$ is a current phase corresponding to one of the plurality of switches.

16. The method according to claim 13, wherein the amplifier circuit comprises an operational amplifier configured as a voltage-current converter, the first input thereof corresponding a non-inverting input the second input thereof corresponding to a second inverting input.

* * * * *

UNITED STATES PATENT AND TRADEMARK OFFICE
CERTIFICATE OF CORRECTION

| | |
|---|---|
| PATENT NO. | : 8,044,645 B2 |
| APPLICATION NO. | : 11/911486 |
| DATED | : October 25, 2011 |
| INVENTOR(S) | : Zambetti et al. |

Page 1 of 1

It is certified that error appears in the above-identified patent and that said Letters Patent is hereby corrected as shown below:

Column 1, Line 11-17    Delete: "Moreover, the first input 11 and the second input 12 of the operational amplifier 10 are the only two pins CS+ and CS- used by a controller 15 to read the current $I_{OUT}$. The controller 15 is schematically represented in the figure and operates on the input voltage $V_{IN}$ of the first and second switch 3a and 3b to keep the sum of the current phases $I_{PHASE1}$, $I_{PHASE2}$ and thus the total current $I_{OUT}$ constant."

Insert: --The present invention relates to a multiphase voltage regulator, and more particularly, to a multiphase voltage regulator comprising N parallel converters for providing a desired output voltage proportional to a required current.--

Column 5, Line 58-59    Delete: "and 9. From the signal a ground voltage, and thus also $V_{OUT}$ at a ground voltage as particularly emphasized in FIG. 8."

Insert: --and 9. From the signal point of view, the output terminal 25 can be deemed at a ground voltage, and thus $V_{OUT}$ at a ground voltage as particularly emphasized in FIG. 8.--

Signed and Sealed this
Twenty-eighth Day of August, 2012

David J. Kappos
*Director of the United States Patent and Trademark Office*